(12) United States Patent
Kim et al.

(10) Patent No.: US 8,854,118 B2
(45) Date of Patent: Oct. 7, 2014

(54) CHARGE PUMPING APPARATUS USING OPTIMUM POWER POINT TRACKING AND METHOD THEREOF

(75) Inventors: Chul-Woo Kim, Seoul (KR); Jungmoon Kim, Seoul (KR); Jihwan Kim, Incheon (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 13/593,638

(22) Filed: Aug. 24, 2012

(65) Prior Publication Data

US 2013/0162335 A1   Jun. 27, 2013

(30) Foreign Application Priority Data

Dec. 26, 2011   (KR) .......................... 10-2011-0142305

(51) Int. Cl.
*G05F 1/10* (2006.01)
*H02M 3/07* (2006.01)
(52) U.S. Cl.
CPC ..................................... *H02M 3/073* (2013.01)
USPC ......................................................... 327/536

(58) Field of Classification Search
USPC .................. 327/530, 534–538, 540, 541, 543
See application file for complete search history.

(56) References Cited

U.S. PATENT DOCUMENTS

2011/0204963 A1*   8/2011   Kim .............................. 327/536

\* cited by examiner

*Primary Examiner* — Sibin Chen
(74) *Attorney, Agent, or Firm* — Alston & Bird LLP

(57) ABSTRACT

A charge pumping apparatus includes a voltage pumping unit for pumping an input voltage, a voltage pumping control unit for controlling the voltage pumping unit according to a comparison result between the input voltage and an input criterion voltage and a comparison result between an output voltage output from the voltage pumping unit and an output criterion voltage, and an optimum power point tracking unit for tracking an optimum power point in the case of detecting that the output voltage decreases lower than the output criterion voltage, and adjusting an input impedance to change the input criterion voltage to a voltage corresponding to the optimum power point, wherein the optimum power point is a power point where an input power according to the input voltage becomes a maximum. Since the optimum power point is tracked by measuring only a voltage without a current sensor, a power loss is small.

7 Claims, 5 Drawing Sheets

CHARGE PUMPING APPARATUS USING OPTIMUM POWER POINT TRACKING AND METHOD THEREOF

CROSS-REFERENCE TO RELATED APPLICATION

This application claims priority to Korean Patent Application No. 10-2011-0142305 filed on Dec. 26, 2011, and all the benefits accruing therefrom under 35 U.S.C. §119, the contents of which in its entirety are herein incorporated by reference.

TECHNICAL FIELD

The following disclosure relates to a charge pumping apparatus using optimum power point tracking, and in particular, to a charge pumping apparatus ensuring small power loss by tracking an optimum power point by measuring only a voltage without a current sensor, and a charge pumping method and a recording medium thereof.

BACKGROUND

Various environmental energy sources such as light, heat, vibrations and RF may be utilized for supplying power to a load such as a wireless sensor network. The wireless sensor network may have a problem in maintenance such as the exchange of a battery. Therefore, if energy harvesting which utilizes environmental energy is used, the wireless sensor network may be operated with an infinite life. Among various kinds of energy harvesting techniques, light energy harvesting has the best capability since its energy source is abundant and can be easily obtained. However, since the magnitude of available energy source is very small when using indoor light energy or being used in a dark day, an energy harvesting circuit should be designed to use a low power, and an existing energy harvesting technique should be improved.

The light energy harvesting system needs a voltage converter for converting a low input voltage obtained from a solar cell, which plays a role of energy harvester (hereinafter, referred to as a "harvester"), into a voltage of a high level, which may be utilized by a load. In case of an inductive DC-DC converter using an inductor, since an external inductor is used, there are drawbacks in costs and size.

The maximum power point tracking (hereinafter, referred to as "MPPT") technique represents a technique of controlling an input impedance so that an output power of a harvester becomes a maximum power point (hereinafter, referred to as "MPP"). Generally, the MPPT technique should be applied to an energy harvesting circuit receiving power from a harvester.

Since a charge pump connected to a harvester with a specific curve has a separate current detector and a control signal generating unit in order to transfer an optimum power to a storage medium such as a capacitor and a battery, power of the current detector is wasted in proportion to the output current. In addition, the MPPT technique should be designed with a very low power since it is always operating. Moreover, a separate voltage adjuster is required for converting a generated output voltage to a fixed voltage necessary to a load, which causes another loss.

SUMMARY

An embodiment of the present invention is directed to providing a charge pumping apparatus using optimum power point tracking.

Another embodiment of the present invention is directed to providing a charge pumping method using optimum power point tracking.

The present disclosure is also directed to providing a computer-readable recording medium on which programs for executing the above method at a computer are recorded.

In one general aspect, the present disclosure provides a charge pumping apparatus, which includes: a voltage pumping unit for pumping an input voltage; a voltage pumping control unit for controlling the voltage pumping unit according to a comparison result between the input voltage and an input criterion voltage and a comparison result between an output voltage output from the voltage pumping unit and an output criterion voltage; and an optimum power point tracking unit for tracking an optimum power point in the case of detecting that the output voltage decreases lower than the output criterion voltage, and adjusting an input impedance to change the input criterion voltage to a voltage corresponding to the optimum power point, wherein the optimum power point is a power point where an input power according to the input voltage becomes a maximum.

According to an embodiment of the present disclosure, the optimum power point tracking unit may track the optimum power point while pumping the input criterion voltage to a predetermined criterion voltage and then lowering the pumped input criterion voltage at predetermined intervals.

According to an embodiment of the present disclosure, the optimum power point tracking unit may lower the input criterion voltage, pumped up to the criterion voltage, at the intervals by using a Digital/Analog (D/A) converter controlled by a counter.

In another general aspect, the present disclosure provides a charge pumping method, which includes: comparing an output voltage with an output criterion voltage; tracking an optimum power point in a case where the output voltage decreases lower than the output criterion voltage; and adjusting an input impedance to change an input criterion voltage to a voltage corresponding to the optimum power point, wherein the optimum power point is a power point where an input power according to the input voltage becomes a maximum.

In another general aspect, the present disclosure provides a computer-readable recording medium on which programs for executing the charge pumping method are recorded.

According to the present disclosure, since the optimum power point is tracked by measuring only a voltage without a current sensor, a power loss is small. In addition, the present disclosure may be used for a place where an input voltage is very small and a produced power is seriously restricted, like a light harvester.

BRIEF DESCRIPTION OF THE DRAWINGS

The above and other objects, features and advantages of the present invention will become apparent from the following description of certain exemplary embodiments given in conjunction with the accompanying drawings, in which.

REFERENCE SYMBOLS

110: voltage pumping unit
120: voltage pumping control unit
130: optimum power point tracking unit

DETAILED DESCRIPTION OF EMBODIMENTS

Prior to describing the present disclosure in detail, the outline of solutions to be performed by the present disclosure and the essence of technical spirit of the present disclosure will be proposed first.

A charge pumping apparatus includes a voltage pumping unit for pumping an input voltage, a voltage pumping control unit for controlling the voltage pumping unit according to a comparison result between the input voltage and an input criterion voltage and a comparison result between an output voltage output from the voltage pumping unit and an output criterion voltage, and an optimum power point tracking unit for tracking an optimum power point in the case of detecting that the output voltage decreases lower than the output criterion voltage, and adjusting an input impedance to change the input criterion voltage to a voltage corresponding to the optimum power point, wherein the optimum power point is a power point where an input power according to the input voltage becomes a maximum.

The charge pumping apparatus according to an embodiment of the present disclosure may be used in a light harvesting system. In addition, the charge pumping apparatus according to an embodiment of the present disclosure may be used in various low-power systems which may use a charge pumping circuit and optimum power point tracking.

Hereinafter, the present disclosure will be described in more detail based on preferred embodiments. However, these embodiments are for better understanding of the present disclosure, and it is obvious to those skilled in the art that the scope of the present disclosure is not limited thereto.

In order to clarify the solution of the present disclosure to the problems, the configuration of the present disclosure is described in detail with reference to the accompanying drawings where the same component is endowed with the same reference symbol at different drawings. Moreover, when a drawing is explained, a component depicted in another drawing may be recited. In addition, in a case where detailed description of known functions or configurations in relation to the present disclosure is judged as unnecessarily making the essence of the present disclosure vague, the detailed description will be excluded. As used herein, the singular forms "a", "an" and "the" are intended to include the plural forms as well, unless the context clearly indicates otherwise. It will be further understood that the terms "comprises" and/or "comprising", when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
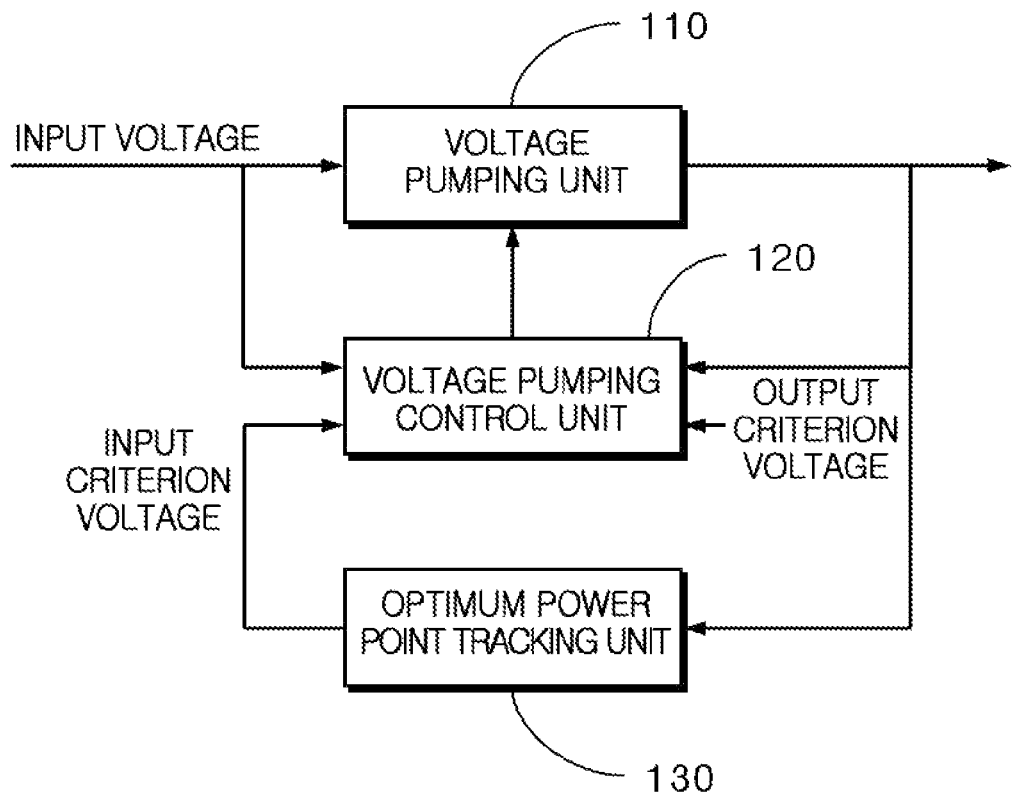
FIG. 1 is a block diagram showing a charge pumping apparatus according to an embodiment of the present disclosure.

FIG. 1 is a block diagram showing a charge pumping apparatus according to an embodiment of the present disclosure.

The charge pumping apparatus according to an embodiment of the present disclosure includes a voltage pumping unit 110, a voltage pumping control unit 120, and an optimum power point tracking unit 130.

The voltage pumping unit 110 pumps an input voltage.

In more detail, the voltage pumping unit 110 pumps the input voltage to generate an output voltage. In other words, in a case where an input voltage is lower than a voltage output to a load, the input voltage is pumped. The voltage pumping unit 110 is controlled by the voltage pumping control unit 120, and operates or stops its operation under the control of the voltage pumping control unit 120.

An input portion of the voltage pumping unit 110 may include an input capacitor, and an output portion of the voltage pumping unit 110 may include an output capacitor. An output voltage according to the input voltage may be controlled while charging/discharging the input capacitor and the output capacitor.

The voltage pumping control unit 120 controls the voltage pumping unit 110 according to a comparison result between the input voltage and an input criterion voltage and a comparison result between the output voltage output from the voltage pumping unit 110 and an output criterion voltage.

In more detail, the voltage pumping control unit 120 controls operations of the voltage pumping unit 110 by using the measured input voltage and output voltage. Criterions for the input voltage and the output voltage are the input criterion voltage and the output criterion voltage. In a case where the input voltage is higher than the input criterion voltage and the output voltage is lower than the output criterion voltage, the voltage pumping unit 110 is operated, and in a case where the input voltage is higher than the input criterion voltage and the output voltage is higher than the output criterion voltage, the operation of the voltage pumping unit 110 is stopped. In a case where the input voltage is higher than the input criterion voltage, the input voltage is input to the voltage pumping unit 110. In addition, in a case where the output voltage is higher than the output criterion voltage, the output voltage is output to the load. In a case where the output voltage is higher than the output criterion voltage, power is being sufficiently supplied to the load, and so the operation of the voltage pumping unit 110 is not necessary. However, in a case where the input voltage is present but the output voltage is lower than the output criterion voltage, since a sufficiently voltage may not be output, the voltage pumping unit 110 is operated to pump the input voltage. In other words, in a case where the input voltage is higher than the input criterion voltage but the output voltage is lower than the output criterion voltage, the voltage pumping unit 110 is operated to pump the input voltage.

The output voltage is detected by measuring a voltage without a current sensor. If power is measured based on current and voltage by using a current sensor, a power loss occurs due to the current sensor. An analog current sensor consumes power in proportion to a load current and has problems such as mismatching. Therefore, the optimum power point tracking using a current sensor has a problem in accuracy and is not appropriate for a place where power is seriously limited. In order to reduce the power loss, only a voltage is measured and a current is not measured. Since only a voltage is measured, a power loss decreases, and the voltage pumping unit 110 may be used for a low-power system such as a light harvesting system which is sensitive to a power loss.

If it is detected that the output voltage decreases lower than the output criterion voltage, the optimum power point tracking unit 130 tracks an optimum power point of the input voltage and adjusts an input impedance to change the input criterion voltage to an input criterion voltage corresponding to the optimum power point.

In more detail, when the input voltage which has been input over the input criterion voltage decreases due to external environments or the like, the optimum power point tracking unit 130 is operated to output an optimum power with the input voltage. The optimum power point is a power point where the input power according to the input voltage becomes a maximum. The power point means a location of power according to a specific voltage. The operation of the optimum power point tracking unit 130 is determined by measuring the output voltage, rather than the input voltage. Since the voltage pumping device is directed to supply a necessary voltage to a load, whether tracking an optimum power point may be determined by using the output voltage supplied to a load, rather than the input voltage, for the accuracy. If it is detected that the output voltage decreases lower than output criterion voltage, the optimum power point is tracked, and the input impedance is adjusted to change the input criterion voltage to an input criterion voltage corresponding to the optimum power point. Since the impedance is adjusted to change the input criterion voltage to the optimum power point, stability is ensured in frequency. In the case of tracking an optimum power point by controlling frequency, a current sensor is necessary and frequency may be unstable. Therefore, by adjusting the input impedance, an optimum power point may be stably tracked. In order to adjust the input impedance, various impedance control circuits or impedance control devices may be used.

In order to track an optimum power point, the optimum power point tracking unit 130 pumps the input criterion voltage to a preset criterion voltage, and then tracks the optimum power point while lowering the pumped input criterion voltage at predetermined intervals. In order to lower the input criterion voltage at predetermined intervals, a Digital/Analog (D/A) converter controlled by a counter is used. In addition, the criterion voltage for pumping the input criterion voltage may be a criterion voltage (DAC criterion voltage) of the D/A converter.

The optimum power point tracking unit 130 will be described later in detail with reference to FIG. 3.

Figure 2:
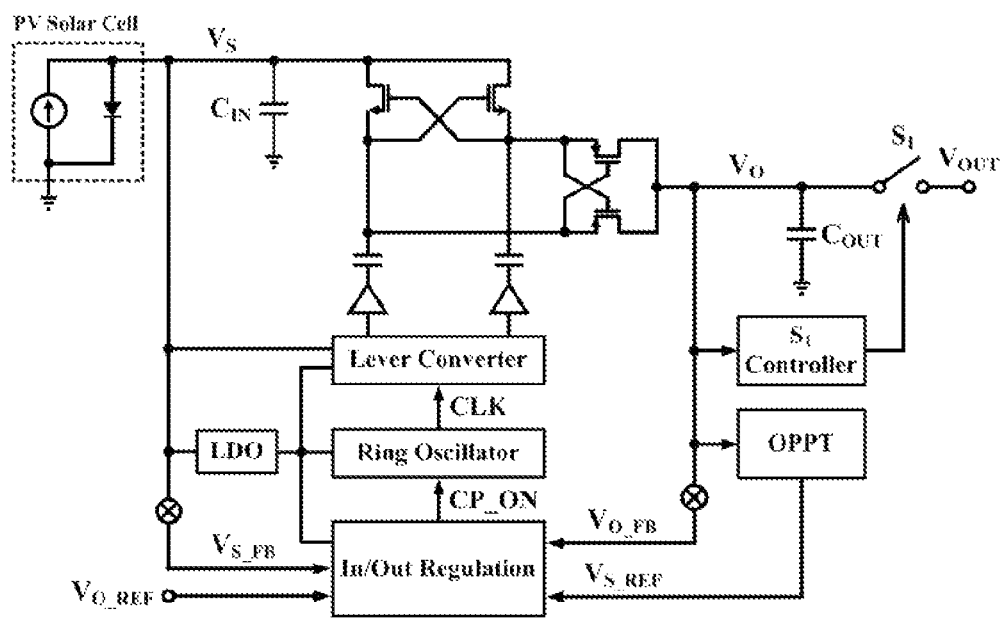
FIG. 2 is a circuit diagram showing a charge pumping apparatus according to another embodiment of the present disclosure.

FIG. 2 is a circuit diagram showing a charge pumping apparatus according to another embodiment of the present disclosure.

The charge pumping apparatus receives energy from a photovoltaic (PV) solar cell, pumps the voltage and transfers a voltage necessary to a load. If it is determined that the voltage pumping unit needs to operate by comparing an input voltage (VS_FB) with an input criterion voltage (VS_REF) and comparing an output voltage (VO_FB) with an output criterion voltage (VO_REF), a ring oscillator generates a clock, and a voltage is pumped according to the clock by a level converter. A switch S1 for transferring the output voltage to a load is controlled by a S1 controller according to the output voltage. If it is detected that the output voltage decreases lower than the output criterion voltage, the optimum power point tracking (OPPT) unit tracks an optimum power point and changes the input criterion voltage into an input criterion voltage corresponding to the optimum power point.

FIG. 2 shows a circuit according to an embodiment, and various kinds of circuits may also be used.

Figure 3:
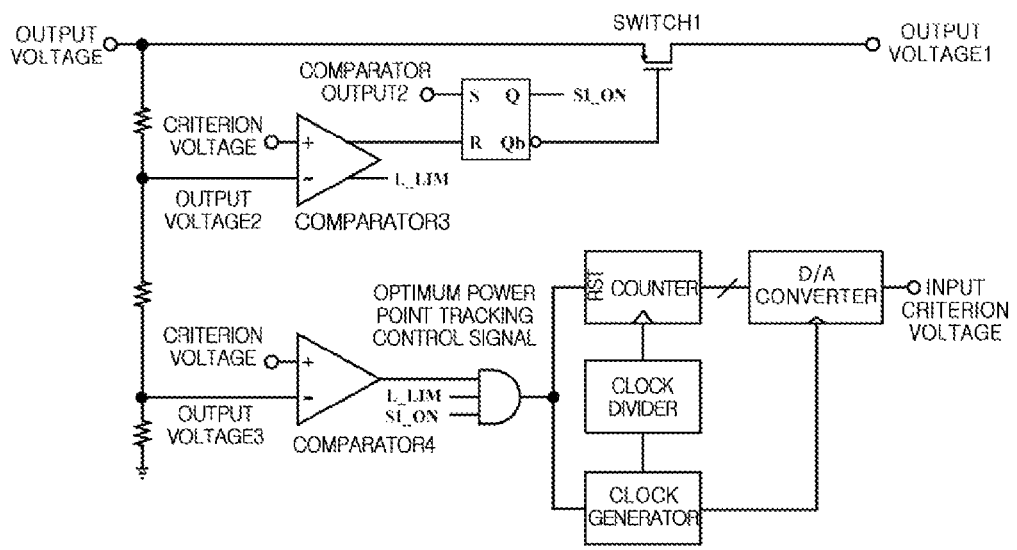
FIG. 3 is a diagram showing an optimum power point tracking unit according to an embodiment of the present disclosure.

FIG. 3 is a diagram showing an optimum power point tracking unit 130 according to an embodiment of the present disclosure.

The optimum power point tracking unit 130 compares an output voltage, detected by measuring a voltage without a current sensor, with an output criterion voltage to determine whether or not to operate the voltage pumping unit. In a case where the output voltage is higher than the output criterion voltage, the switch 1 is closed, and the output voltage is transferred to a load. However, if the output voltage rapidly decreases lower than the output criterion voltage, it may be determined whether the decrease of the output voltage is out of the voltage range of the optimum power point tracking. In a case where the decrease of the output voltage is out of the voltage range of the optimum power point tracking, even though optimum power point tracking is performed, a sufficient power may not be supplied to the load. Therefore, the optimum power point tracking unit 130 does not operate, and charging is performed from the output capacitor by using the input voltage. If the output voltage continuously fluctuates near the output criterion voltage, the voltage pumping unit 110 may repeat turning on and off, which is called a chattering phenomenon. In order to prevent the chattering phenomenon, a hysteresis characteristic may be endowed to the switch 1 by using a comparator 3. The comparator 3 may employ a hysteresis comparator.

In a case where the output voltage is detected to decrease lower than the output criterion voltage and the decrease of the output voltage is within the voltage range of the optimum power point tracking, the optimum power point tracking unit 130 operates. A comparator 4 compares an output voltage, detected by measuring a voltage without a current sensor, with an output criterion voltage to determine whether or not to operate the optimum power point tracking unit 130. As a result of the determination, if the optimum power point tracking unit 130 needs to operate, the clock generator provides a clock signal to the counter via a clock divider. The counter is a device for storing a number and increasing or decreasing the number by a certain degree. In order to track an optimum power point of the input voltage, the counter controls the D/A converter (DAC) to decrease the input criterion voltage as much as the interval so that the input criterion voltage may search regions around the optimum power point.

The charge pumping apparatus according to the embodiment of the present disclosure may be used for an input voltage using a restricted input voltage such as light energy harvesting, since it has a small power loss. In other cases, the charge pumping apparatus according to an embodiment of the present disclosure may also be used for various kinds of devices which require a low power loss. In order to describe the optimum power point tracking unit 130 in more detail, light energy harvesting will be given as an example. A light harvesting system may be used for supplying its power to a sensor or the like. When harvesting energy by using a light energy, an input energy may be inconsistent and may change seriously depending on external environments. In addition, under an indoor environment or an environment with no light, the input energy should be utilized to the maximum so that the energy may be transferred to a load. Therefore, an operation at an optimum power point is required. In addition, the power loss needs to be reduced. The light energy harvesting system requires a voltage converter for converting a low input voltage, obtained from a solar cell which plays a role of an energy harvester, into a high-level voltage which may be utilized by a load. In addition, for the efficiency of energy, it is needed to reduce a power loss by measuring only a voltage without measuring a current. In order to convert the voltage with a low power, the charge pumping apparatus according to an embodiment of the present disclosure may be used.

Figure 3A:
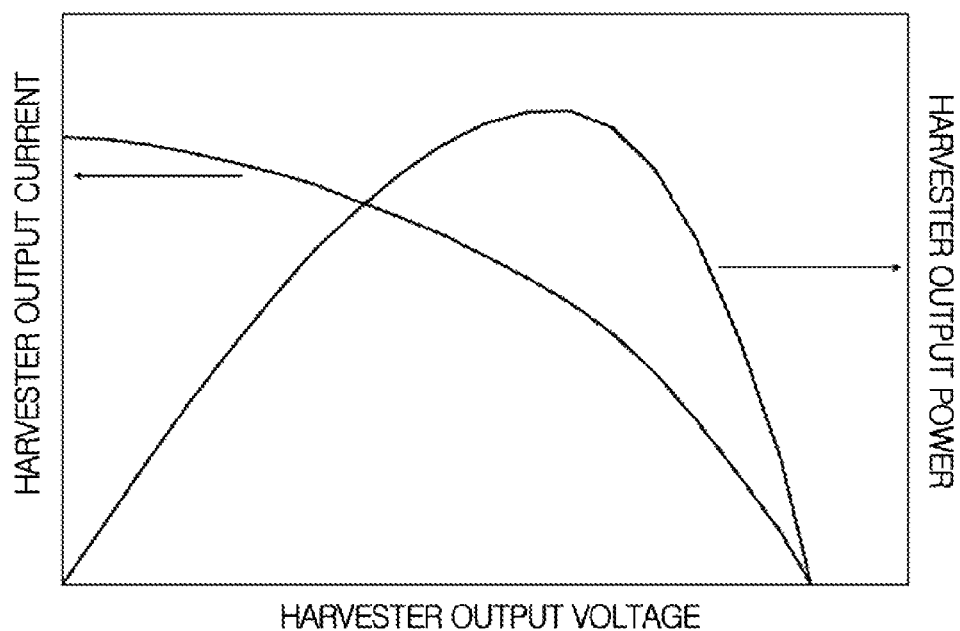
FIG. 3a is a graph showing characteristics of a light energy harvester.

FIG. 3a is a graph showing characteristics of a light energy harvester. Due to an inherent characteristic of the harvester, an output power of the harvester increases till the optimum power point in proportion to the harvester output voltage (an input voltage of the charge pumping apparatus), and after the optimum power point, the harvester output voltage (the input voltage of the charge pumping apparatus) decreases. The optimum power point tracking unit 130 tracks the optimum power point and adjusts an input impedance to change the input criterion voltage into the optimum power point so that the optimum harvester output voltage (the input voltage of the charge pumping apparatus) may be used. In a case where the input criterion voltage does not reach the optimum power point, it may be determined that the optimum power point is out of a digital/analog output range. Therefore, the optimum power point may be tracked again by replacing the criterion voltage for pumping the input criterion voltage with a low value. The optimum power point is tracked to a specific range, not an entire range of the output voltage, and in a case where the optimum power point is not reached, the criterion voltage is replaced, and the optimum power point is tracked again.

Figure 3B:
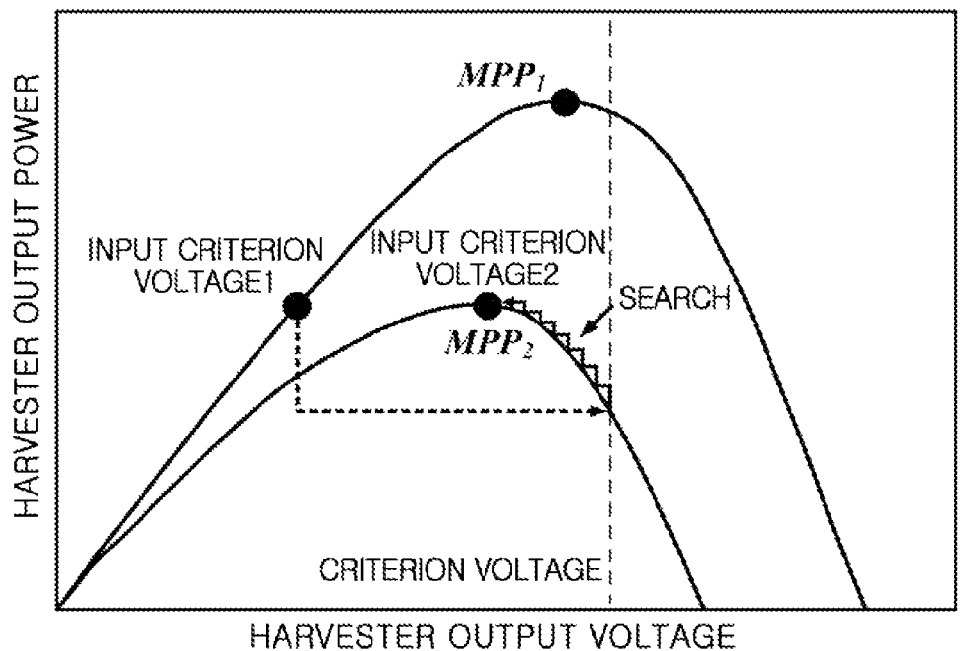
FIG. 3*b* is a graph showing tracking of an optimum power point.

In other words, as shown in FIG. 3b, if a harvester output voltage (the input voltage of the charge pumping apparatus) decreases due to an external environment or the like while a charge pumping operation is performed by using an input criterion voltage 1, the harvester characteristic changes. In order to find an optimum power point according to the changed harvester characteristic, input impedance is firstly adjusted to pump the input criterion voltage 1, which is an existing input criterion voltage, to a preset criterion voltage. While lowering the input criterion voltage, which has been pumped up to the criterion voltage, at regular intervals, a point where the harvester output power becomes a maximum (an optimum power point, MPP2) is tracked.

Figure 3C:
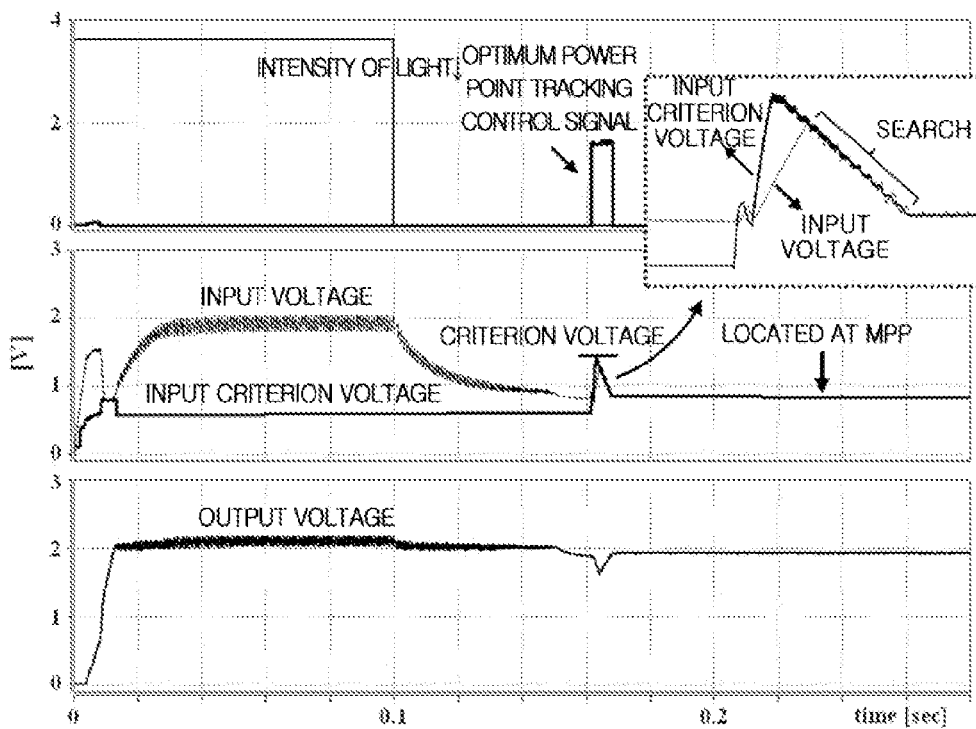
FIG. 3*c* is a diagram showing the change of a voltage according to the tracking of an optimum power point.

FIG. 3c is a diagram showing the change of a voltage according to the tracking of an optimum power point.

In a case where the intensity of light is great, an input voltage of the charge pumping apparatus (harvester output voltage) is higher than the input criterion voltage, and accordingly the output voltage is sufficiently supplied to the load. Therefore, the input voltage needs not be located at the optimum power point. However, if the intensity of light decreases due to an external environment or the like, since the input criterion voltage is not located at the optimum power point in a state where the supplied power is limited, the output voltage decreases. If the output voltage is detected to decrease lower than output criterion voltage, the optimum power point tracking unit 130 operates. After the input criterion voltage is pumped up to a predetermined criterion voltage, an optimum power point is tracked while lowering the input criterion voltage at regular intervals. The optimum power point is tracked, and the input criterion voltage is changed into the optimum power point. The input voltage may be optimally used at the changed input criterion voltage, and therefore, the decreasing output voltage may be pumped to the output criterion voltage so that a voltage necessary to the load may be supplied.

Figure 4:
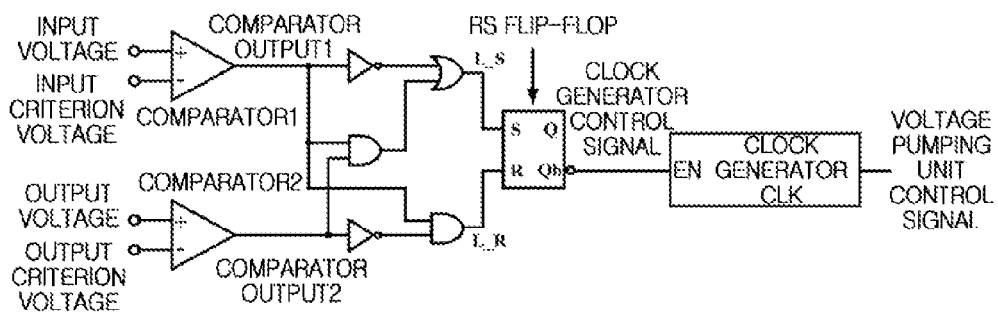
FIG. 4 is a graph showing a voltage pumping control unit according to an embodiment of the present disclosure.

FIG. 4 is a graph showing the voltage pumping control unit 120 according to an embodiment of the present disclosure.

The voltage pumping control unit 120 controls the voltage pumping unit 110 according to the input voltage and the output voltage. Until the output voltage reaches the output criterion voltage, the voltage pumping unit is operated (the voltage pumping unit 110 is in an ON state). The comparator 1 compares the input voltage with an input criterion voltage. In a case where the input voltage is higher than the input criterion voltage (comparator output 1=HIGH), charges of the input capacitor are transferred to the output through the voltage pumping unit 110. At this time, if a compartor 2 detects that the output voltage is higher than the output criterion voltage (comparator output 2=HIGH), since the energy necessary to the load is already sufficiently supplied, the operation of the voltage pumping unit 110 is stopped (clock generator control signal=LOW, the voltage pumping unit 110 is in an OFF state). On the contrary, in a case where the output voltage is lower than the output criterion voltage (L_R=HIGH), the voltage pumping unit 110 is operated (clock generator control signal=HIGH) to transfer charges stored in the input capacitor to the output. In addition, in a case where the input voltage is lower than the input criterion voltage (comparator output 1=LOW, L_S=HIGH), the input capacitor is charged with current supplied from the harvester, and the input voltage is adjusted to coincide with an input criterion voltage located at an optimum point.

Figure 5:
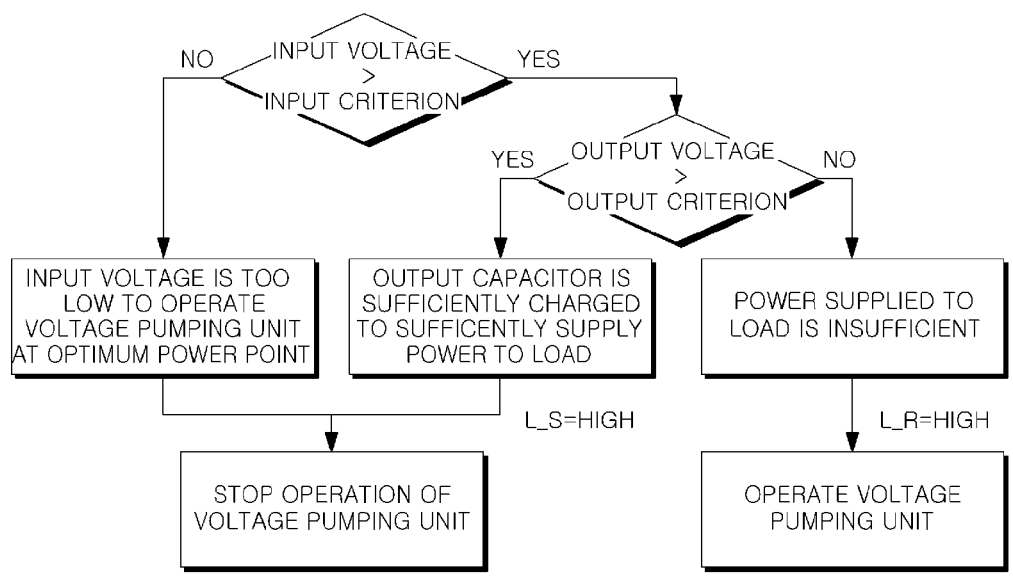
FIG. 5 is a flowchart for illustrating an operation of a voltage pumping unit according to the voltage pumping control unit.

FIG. 5 is a flowchart for illustrating an operation of the voltage pumping unit 110 according to the voltage pumping control unit 120.

If a voltage is input, the input voltage is compared with an input criterion voltage. In a case where the input voltage is lower than the input criterion voltage, since the input voltage is too low to operate the voltage pumping unit 110 at an optimum power point, the voltage pumping unit 110 is not operated, and the input capacitor is charged. In a case where the input voltage is higher than the input criterion voltage and the output voltage is higher than the output criterion voltage, since the output capacitor is sufficiently charged and power may be sufficiently supplied to the load, the voltage pumping unit 110 stops operation (the input capacitor is charged). Meanwhile, if the input voltage is higher than the input criterion voltage and the output voltage is lower than the output criterion voltage, since the power supplied to the load is insufficient, the voltage pumping unit 110 operates (the input capacitor is discharged).

Figure 6:
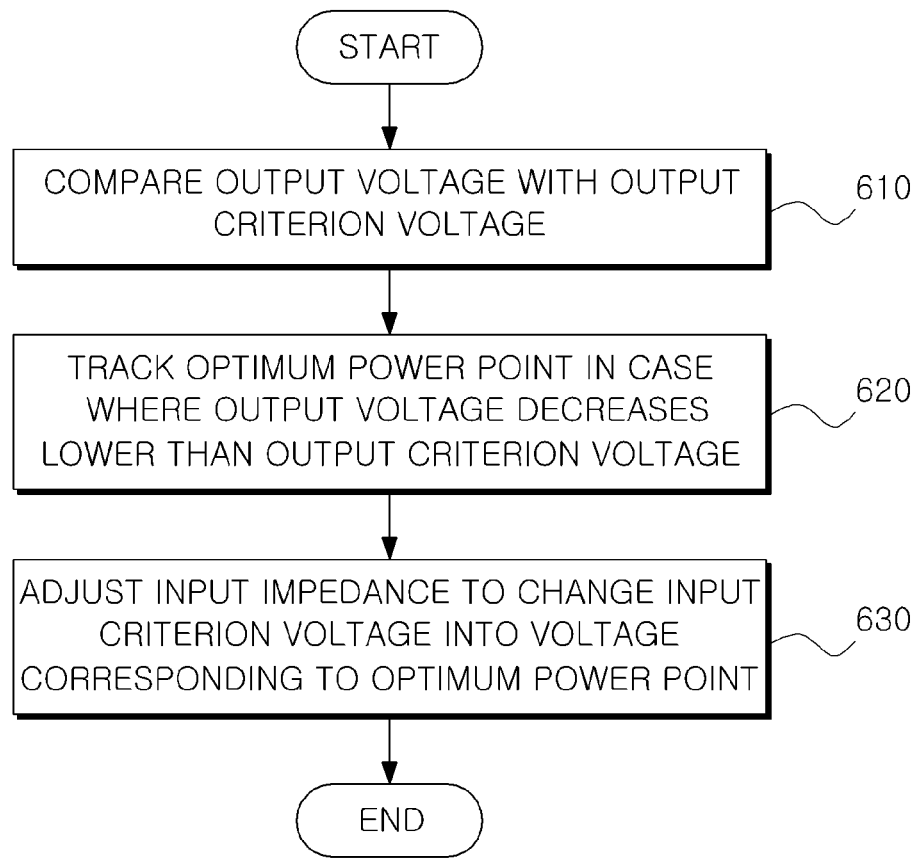
FIG. 6 is a flowchart for illustrating a charge pumping method according to an embodiment of the present disclosure.

FIG. 6 is a flowchart for illustrating a charge pumping method according to an embodiment of the present disclosure.

In Operation 610, the output voltage is compared with an output criterion voltage.

In more detail, in order to detect the change of the output voltage, the output voltage is detected and compared with the output criterion voltage. In a case where the change of the output power is detected, it is needed to measure a current and a voltage. In a case where a current is measured by using a current sensor, a power loss occurs due to the current sensor. The power loss deteriorates the efficiency at a light harvesting system using a low power. Therefore, a voltage is measured without a current sensor, and whether tracking an optimum power point is determined by using the output voltage detected by measuring a voltage.

In Operation 620, in a case where the output voltage decreases lower than the output criterion voltage, an optimum power point is tracked.

In more detail, if it is detected that the output voltage decreases lower than the output criterion voltage while power is supplied to a load, an optimum power point for the input voltage is tracked. The optimum power point is tracked so that an optimum power may be used. Detailed description for this operation corresponds to the explanation about the optimum power point tracking unit 130 of FIG. 1, and thus the explanation about the optimum power point tracking unit 130 of FIG. 1 may be referred to.

In Operation 630, input impedance is adjusted to change the input criterion voltage into a voltage corresponding to the optimum power point.

In more detail, if the input impedance is adjusted, the input criterion voltage may be changed. Therefore, so that an optimum power may be output, the input criterion voltage is changed into the optimum power point. Detailed description for this operation corresponds to the explanation about the optimum power point tracking unit 130 of FIG. 1, and thus the explanation about the optimum power point tracking unit 130 of FIG. 1 may be referred to.

Embodiments of the present disclosure may be implemented as program commands executable by various kinds of computer means and recorded on computer-readable media. The computer-readable media may include program commands, data files, data structures or the like, solely or in combination. The program commands recorded on the media may be specially designed for the present disclosure or well known to and available by those skilled in the computer software art. The computer-readable media include, for example, magnetic media such as hard disks, floppy disks and magnetic tapes, optical media such as CD-ROM and DVD, magneto-optical media such as floptical disks, and hardware devices such as ROM, RAM and flash memories, which are specially configured to store and perform program commands. The program commands include machine language codes made by compilers and high-level language codes which may be executed by a computer by means of an interpreter or the like. The hardware device may be configured to operate as at least one software module for performing the operations of the present disclosure, or vice versa.

While the present invention has been described with respect to detailed components, limited embodiments and accompanying drawings, they are provided just for better understanding of the present disclosure, and it will be apparent to those skilled in the art that various changes and modifications may be made without departing from the spirit and scope of the invention as defined in the following claims.

Therefore, the spirit of the present disclosure should not be limited to the above embodiments, and the appended claims and its equivalents or modifications should be interpreted as being within the scope of the present disclosure.

What is claimed is:

1. A charge pumping apparatus, comprising:
  a voltage pumping unit for pumping an input voltage;
  a voltage pumping control unit for controlling the voltage pumping unit according to a comparison result between the input voltage and an input criterion voltage and a comparison result between an output voltage output from the voltage pumping unit and an output criterion voltage; and
  an optimum power point tracking unit for tracking an optimum power point in the case of detecting that the output voltage decreases lower than the output criterion voltage, and adjusting an input impedance to change the input criterion voltage to a voltage corresponding to the optimum power point,
  wherein the optimum power point is a power point where an input power according to the input voltage becomes a maximum.

2. The charge pumping apparatus according to claim 1, wherein the optimum power point tracking unit tracks the optimum power point while pumping the input criterion voltage to a predetermined criterion voltage and then lowering the pumped input criterion voltage at predetermined intervals.

3. The charge pumping apparatus according to claim 2, wherein the optimum power point tracking unit lowers the input criterion voltage, pumped up to the criterion voltage, at the intervals by using a Digital/Analog (D/A)converter controlled by a counter.

4. The charge pumping apparatus according to claim 1,
  wherein the voltage pumping control unit operates the voltage pumping unit in a case where the input voltage is higher than the input criterion voltage and the output voltage is lower than the output criterion voltage, and
  wherein the voltage pumping control unit stops the operation of the voltage pumping unit in a case where the input voltage is higher than the input criterion voltage and the output voltage is higher than the output criterion voltage.

5. A charge pumping method, comprising:
  comparing an output voltage with an output criterion voltage;
  tracking an optimum power point in a case where the output voltage decreases lower than the output criterion voltage; and
  adjusting an input impedance to change an input criterion voltage to a voltage corresponding to the optimum power point,
  wherein the optimum power point is a power point where an input power according to an input voltage becomes a maximum,
  wherein the input voltage is pumped in a case where the input voltage is higher than the input criterion voltage and the output voltage is lower than the output criterion voltage, and
  wherein the input voltage is not pumped in a case where the input voltage is higher than the input criterion voltage and the output voltage is higher than the output criterion voltage.

6. The charge pumping method according to claim 5, wherein said tracking of an optimum power point tracks the optimum power point while pumping the input criterion voltage to a predetermined criterion voltage and then lowering the pumped input criterion voltage at predetermined intervals.

7. The charge pumping method according to claim 6, wherein said tracking of an optimum power point lowers the input criterion voltage, pumped up to the criterion voltage, at the intervals by using a D/A converter controlled by a counter.

\* \* \* \* \*